(12) United States Patent
Hwang et al.

(10) Patent No.: US 10,281,009 B2
(45) Date of Patent: May 7, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Hyun Sik Kwon, Seoul (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/681,999

(22) Filed: Aug. 21, 2017

(65) Prior Publication Data

US 2018/0163822 A1    Jun. 14, 2018

(30) Foreign Application Priority Data

Dec. 14, 2016 (KR) .................. 10-2016-0170770

(51) Int. Cl.
*F16H 3/62* (2006.01)
*F16H 37/04* (2006.01)
*F16H 3/66* (2006.01)

(52) U.S. Cl.
CPC ............ *F16H 3/62* (2013.01); *F16H 3/66* (2013.01); *F16H 37/04* (2013.01); *F16H 2037/048* (2013.01); *F16H 2200/0069* (2013.01); *F16H 2200/201* (2013.01); *F16H 2200/2046* (2013.01)

(58) Field of Classification Search
None
See application file for complete search history.

(56) References Cited

U.S. PATENT DOCUMENTS

| 5,667,451 | A | * | 9/1997 | Park | F16H 47/085 |
| | | | | | 475/276 |
| 5,743,825 | A | * | 4/1998 | Park | F16H 3/663 |
| | | | | | 475/278 |
| 9,273,768 | B2 | | 3/2016 | Beck | |
| 10,107,370 | B1 | * | 10/2018 | Lee | F16H 37/04 |
| 2012/0094799 | A1 | * | 4/2012 | Phillips | F16H 3/66 |
| | | | | | 475/275 |
| 2015/0087469 | A1 | | 3/2015 | Beck | |
| 2017/0241519 | A1 | * | 8/2017 | Kim | F16H 3/666 |
| 2018/0163831 | A1 | * | 6/2018 | Kim | F16H 37/04 |

(Continued)

*Primary Examiner* — Justin Holmes
(74) *Attorney, Agent, or Firm* — Brinks Gilson & Lione (57) ABSTRACT

Ten or more forward speeds and two or more reverse speed are achieved by a planetary gear train of an automatic transmission that includes three planetary gear sets mounted on an input shaft, an output shaft disposed in parallel with the input shaft and having an output gear. The transmission further includes six shafts respectively interconnecting corresponding elements among the input shaft and rotational elements of the three planetary gear sets, a first transfer gear selectively delivering torque between one of the six shafts and the output shaft; and a second transfer gear selectively delivering torque between the output shaft and one rotational element of the third planetary gear set.

11 Claims, 5 Drawing Sheets

(56) References Cited

U.S. PATENT DOCUMENTS

2018/0274660 A1* 9/2018 Kita ................... F16H 57/0445
2018/0283504 A1* 10/2018 Ishikawa ................ F16H 3/66
2018/0306290 A1* 10/2018 Lee ...................... F16H 37/04

* cited by examiner

| Shift-stage | Control element | | | | | | Gear ratio |
|---|---|---|---|---|---|---|---|
| | C1 | C2 | C3 | C4 | B1 | B2 | |
| D1 |  | ● |  | ● | ● |  | 6.200 |
| D2 |  | ● |  | ● |  | ● | 3.556 |
| D3 | ● | ● |  | ● |  |  | 2.000 |
| D4 | ● |  | ● | ● |  |  | 1.262 |
| D5 | ● | ● | ● |  |  |  | 0.800 |
| D6 |  | ● | ● |  |  | ● | 0.628 |
| D7 |  | ● | ● |  | ● |  | 0.562 |
| D8 |  |  | ● |  | ● | ● | 0.492 |
| D9 | ● |  | ● |  | ● |  | 0.459 |
| D10 | ● |  | ● |  |  | ● | 0.381 |
| REV1 | ● |  |  | ● | ● |  | -10.540 |
| REV2 | ● |  |  | ● |  | ● | -2.644 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0170770, filed Dec. 14, 2016, which is incorporated herein by reference in its entirety.

FIELD

The present disclosure relates to an automatic transmission for a vehicle.

BACKGROUND

The statements in this section merely provide background information related to the present disclosure and may not constitute prior art.

Recently, increase of oil price is triggering a hard competition in enhancing fuel consumption of a vehicle.

In this sense, research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages has been developed.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, a recent eight-speed automatic transmission typically shows a gear ratio span in a level of 6.5 to 7.5.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of realizing at least ten forward speeds and at least reverse first speed by a combination of three planetary gear sets arranged on an input shaft, two external gears and six control elements, thereby providing improvement of power delivery performance and fuel consumption and improving installability by reducing a length.

In addition, a wide available range of varying gear teeth of transfer gears enables easily obtaining optimum gear ratios for respective vehicles, thereby improving power delivery performance and fuel consumption.

A planetary gear train of an automatic transmission for a vehicle according to an exemplary form includes: a first planetary gear set having first, second, and third rotational elements; a second planetary gear set having fourth, fifth, and sixth rotational elements; a third planetary gear set having seventh, eighth, and ninth rotational elements; an input shaft mounted with the first, second, and third planetary gear sets at an external circumference of the input shaft; and an output shaft disposed in parallel with the input shaft and provided with an output gear at an external circumference of the output shaft; a first shaft fixedly connected with the first rotational element and selectively acting as a fixed element; a second shaft fixedly connected with the second rotational element and the sixth rotational element and selectively acting as a fixed element; a third shaft fixedly connected with the third rotational element and the seventh rotational element and configured to selectively mesh with the output shaft; a fourth shaft fixedly connected with the fourth rotational element and the input shaft; a fifth shaft fixedly connected with the fifth rotational element and selectively connected with the first shaft and the third shaft respectively; a sixth shaft fixedly connected with the eighth rotational element and selectively connected with the input shaft; a first transfer gear configured to selectively deliver torque between the third shaft and the output shaft; a second transfer gear configured to selectively deliver torque between the output shaft and the ninth rotational element of the third planetary gear set.

The first planetary gear set may include a first sun gear as the first rotational element, a first planet carrier as the second rotational element, and a first ring gear as the third rotational element. The second planetary gear set may include a second sun gear as the fourth rotational element, a second planet carrier as the fifth rotational element, and a second ring gear as the sixth rotational element. The third planetary gear set may include a third sun gear as the seventh rotational element, a third planet carrier as the eighth rotational element, and a third ring gear as the ninth rotational element.

The first, second, and third planetary gear sets are arranged on the input shaft in the order of the first, second, and third planetary gear sets.

The exemplary gear train may further include a first clutch arranged between the first shaft and the fifth shaft, a second clutch arranged between the third shaft and the fifth shaft, a third clutch arranged between the input shaft and the sixth shaft, a fourth clutch arranged between the third shaft and the output shaft, a first brake arranged between the second shaft and a transmission housing, and a second brake arranged between the first shaft and the transmission housing.

The fourth clutch may be directly connected to the first transfer gear.

According to a planetary gear train according to an exemplary form of the present disclosure, a wide range of varying gear teeth may be provided by employing two transfer gears in addition to a combination of planetary gear sets, so as to easily achieve optimum gear ratio and to easily comply with desired performance for respective vehicles.

In addition, according to an exemplary form of the present disclosure, at least ten forward speeds and at least two reverse speeds may be achieved, thereby improving an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In the following description, dividing names of components into first, second and the like is to divide the names because the names of the components are the same as each other and an order thereof is not particularly limited.

Figure 1:
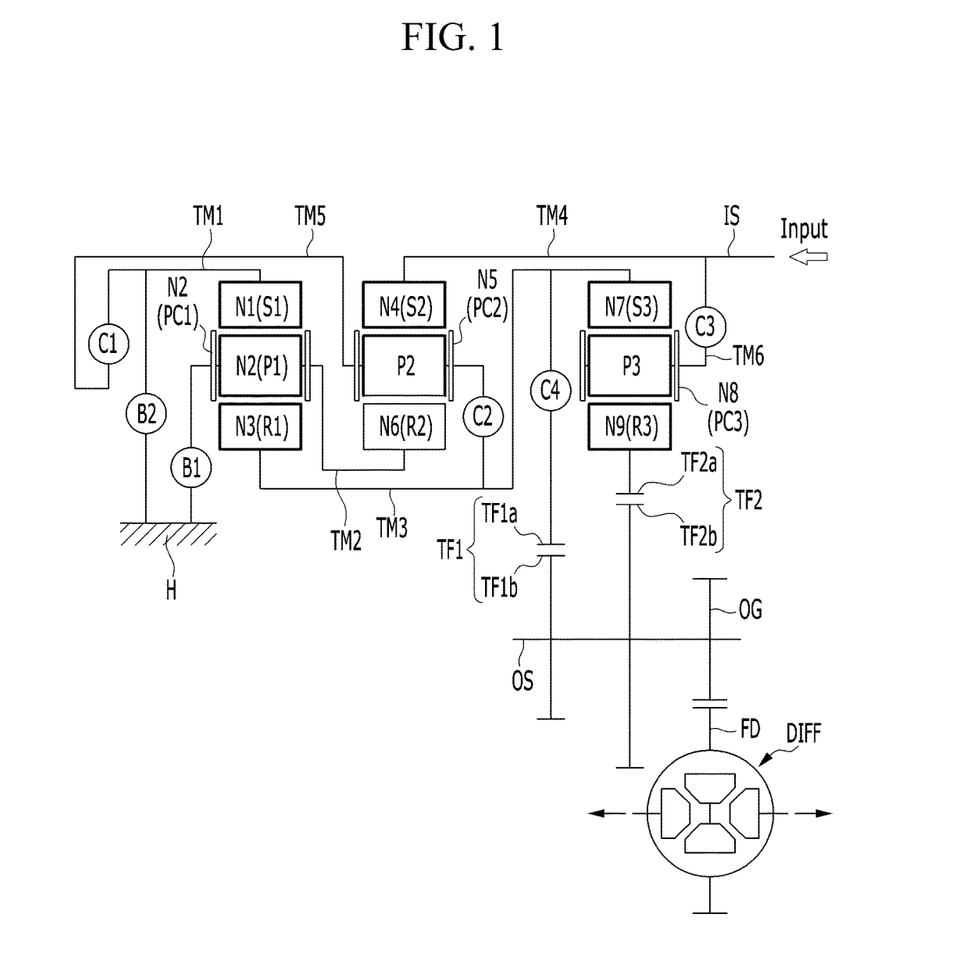
FIG. 1 is a schematic diagram of a planetary gear train according to a first exemplary form of the present disclosure.

FIG. 1 is a schematic diagram of a planetary gear train according to a first exemplary form of the present disclosure.

Referring to FIG. 1, a planetary gear train includes: an input shaft IS; an output shaft OS; first, second, and third planetary gear sets PG1, PG2, and PG3; two transfer gear TF1 and TF2; and control elements of four clutches C1, C2, C3, and C4 and two brakes B1 and B2.

The input shaft IS is an input member and the torque from a crankshaft of an engine is input into the input shaft IS, after being torque-converted through a torque converter.

The output shaft OS acts as an output member, being arranged in parallel with the input shaft IS, includes an output gear OG engaged with a final reduction gear FD of a differential apparatus DIFF, and outputs a shifted driving torque to a drive shaft through the differential apparatus DIFF.

The first, second, and third planetary gear sets PG1, PG2, and PG3 are arranged at external circumference of the input shaft IS. The first, second, and third planetary gear sets PG1, PG2, and PG3 are arranged in the order of the first, second, and third planetary gear sets PG1, PG2, and PG3 from an opposite side of a torque input direction.

The first planetary gear set PG1 is a single pinion planetary gear set, and includes a first sun gear S1, a first planet carrier PC1 that supports a first pinion P1 externally engaged with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 that is internally engaged with the third pinion P3. The third sun gear S3 acts as a seventh rotational element N7, the third planet carrier PC3 acts as an eighth rotational element N8, and the third ring gear R3 acts as a ninth rotational element N9.

In the arrangement of the first, second, and third planetary gear sets PG1, PG2, and PG3, the second rotational element N2 is fixedly connected with the sixth rotational element N6, the third rotational element N3 is fixedly connected with the seventh rotational element N7, by six shafts TM1 to TM6.

The six shafts TM1 to TM6 are hereinafter described in detail.

Each of the six shafts TM1 to TM6 may be a rotational member that fixedly interconnects the input and output shafts and rotational elements of the planetary gear sets PG1, PG2, PG3, or may be a rotational member that selectively interconnects a rotational element to the transmission housing H, or may be a fixed member fixed to the transmission housing H.

The first shaft TM1 is fixedly connected with the first rotational element N1 (first sun gear S1), and selectively connected with the transmission housing H, thereby selectively acting as a fixed element.

The second shaft TM2 is fixedly connected with the second rotational element N2 (first ring gear R1) and the sixth rotational element N6 (second ring gear R2), and selectively connected with the transmission housing H, thereby selectively acting as a fixed element.

The third shaft TM3 is fixedly connected with the third rotational element N3 (first planet carrier PC1) and the seventh rotational element N7 (third sun gear S3).

The fourth shaft TM4 is fixedly connected with the fourth rotational element N4 (second sun gear S2), and also fixedly connected with the input shaft IS, thereby always acting as an input element.

The fifth shaft TM5 is fixedly connected with the fifth rotational element N5 (second planet carrier PC2), and selectively connected with the first shaft TM1 and the third shaft TM3 respectively.

The sixth shaft TM6 is fixedly connected with the eighth rotational element N8 (third ring gear R3), and selectively connected with the fourth shaft TM4.

In addition, a first transfer gear TF1 is arranged between the output shaft OS and the third shaft TM3, and a second transfer gear TF2 is arranged between the output shaft OS and the ninth rotational element N9 of the third planetary gear set PG3.

The first and second transfer gears TF1 and TF2 deliver a shifted torque of the first, second, and third planetary gear sets PG1, PG2, and PG3 to the output shaft OS, according to their gear ratio.

The first transfer gear TF1 includes a first transfer gear TF1a connected with the third shaft TM3 and a first transfer gear TF1b connected with the output shaft OS, and externally gear-meshes the third shaft TM3 and the output shaft OS.

The second transfer gear TF2 includes a second transfer drive gear TF2a connected with an external circumference of the ninth rotational element N9 of the third planetary gear set PG3 and a second transfer driven gear TF2b connected with the output shaft OS. The second transfer gear TF2 externally gear-meshes the ninth rotational element N9 of the third planetary gear set PG3 with the output shaft OS.

As a result, the first and second transfer gears TF1 and TF2 deliver the shifted torque of the first, second, and third planetary gear sets PG1, PG2, and PG3 to the output shaft OS in an opposite rotation, and the gear ratios of the first and second transfer gears TF1 and TF2 may be preset in consideration of desired speed ratio of the transmission.

The control elements include the four clutches C1, C2, C3, and C4 and the two brakes B1 and B2, and are arranged as follows.

The first clutch C1 is arranged between the first shaft TM1 and the fifth shaft TM5, such that the first shaft TM1 and the fifth shaft TM5 may selectively become integral.

The second clutch C2 is arranged between the third shaft TM3 and the fifth shaft TM5, such that the third shaft TM3 and the fifth shaft TM5 may selectively become integral.

The third clutch C3 is arranged between the fourth shaft TM4 and the sixth shaft TM6, such that the fourth shaft TM4 and the sixth shaft TM6 may selectively become integral.

The fourth clutch C4 is arranged between the third shaft TM3 and the output shaft OS, such that the third shaft TM3 and the output shaft OS may be selectively gear-meshed.

As an exemplary arrangement, the fourth clutch C4 may be arranged on the first transfer drive gear TF1a among the two gears TF1a and TF1b of the first transfer gear TF1, and thus may control a torque delivery between the third shaft TM3 and the output shaft OS.

The first brake B1 is arranged between the second shaft TM2 and the transmission housing H, and the second shaft TM2 may selectively act as a fixed element.

The second brake B2 is arranged between the first shaft TM1 and the transmission housing H, and the first shaft TM1 may selectively act as a fixed element.

The third clutch C3 is employed to control a torque delivery route from the input shaft IS to the output shaft OS through the third planetary gear set PG3. Although the third clutch C3 is shown to be arranged to selectively connect the input shaft IS and the sixth shaft TM6 in the first exemplary form, it will be obviously understood that the third clutch C3 may also be arranged on the second transfer drive gear TF2a or the second transfer driven gear TF2b of the second transfer gear TF2.

The fourth clutch C4 is employed to control a torque delivery route from the third shaft TM3 to the output shaft OS. Although the fourth clutch C4 is shown to be arranged on the first transfer drive gear TF1a, it will be obviously understood that the fourth clutch C4 may also be arranged on the first transfer driven gear TF1b.

The control elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

Figure 2:
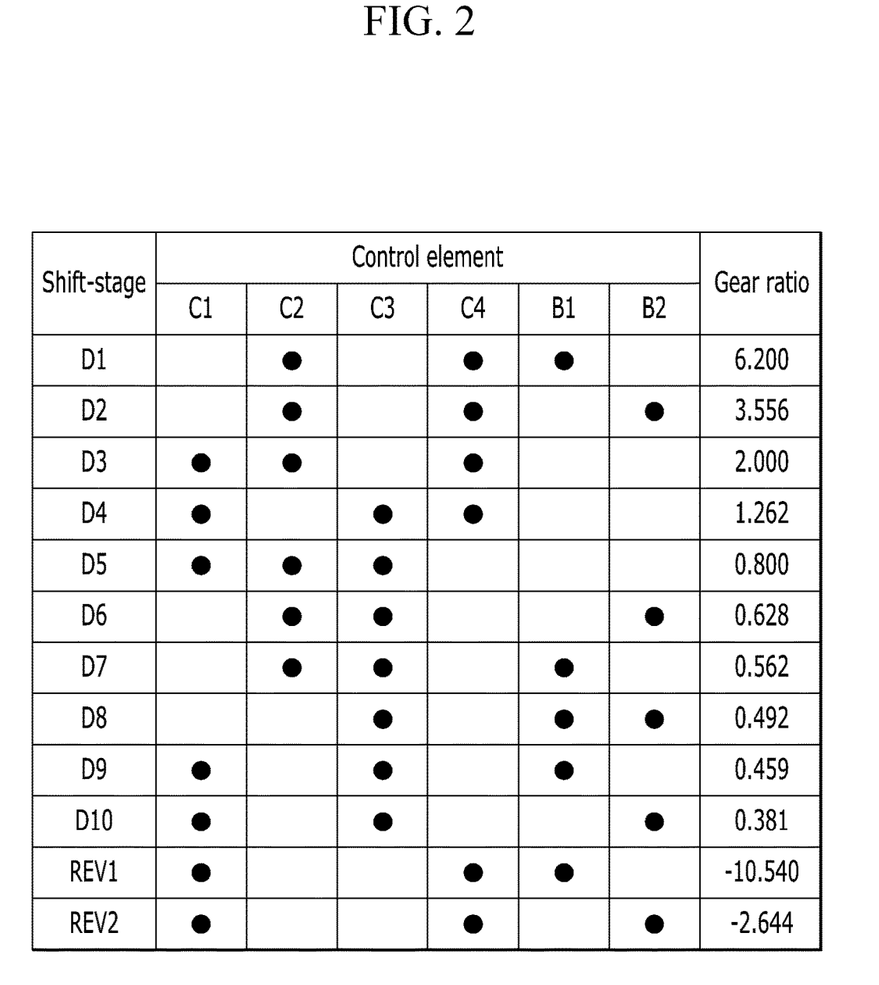
FIG. 2 is an operational chart for respective control elements at respective shift-stages in a planetary gear train according to a first exemplary form of the present disclosure.

FIG. 2 is an operational chart for respective control elements at respective shift-stages in a planetary gear train according to a first exemplary form of the present disclosure.

Referring to FIG. 2, a planetary gear train realizes shifting by operating three control elements among the four clutches C1, C2, C3, and C4 and the two brakes B1 and B2.

[The Forward First Speed]

In the forward first speed D1, the second and fourth clutches C2 and C4 and the first brake B1 are simultaneously operated.

As a result, the third shaft TM3 is connected with the fifth shaft TM5 by the operation of the second clutch C2, third shaft TM3 is externally gear-meshed with the output shaft OS by the operation of the fourth clutch C4, and the torque of the input shaft IS is input to the fourth shaft TM4.

As a result, the second shaft TM2 acts as a fixed element by the operation of the first brake B1, a shifted torque is delivered to the output shaft OS through the first transfer gear TF1 by cooperative operation of respective shafts of the first, second, and third planetary gear sets PG1, PG2, and PG3, thereby realizing the forward first speed, and the delivered torque is output through the output gear OG.

[The Forward Second Speed]

In the forward second speed D2, the second and fourth clutches C2 and C4 and the second brake B2 are simultaneously operated.

As a result, the third shaft TM3 is connected with the fifth shaft TM5 by the operation of the second clutch C2, third shaft TM3 is externally gear-meshed with the output shaft OS by the operation of the fourth clutch C4, and the torque of the input shaft IS is input to the fourth shaft TM4.

Then, the first shaft TM1 acts as a fixed element by the operation of the second brake B2, a shifted torque is delivered to the output shaft OS through the first transfer gear TF1 by cooperative operation of respective shafts of the first, second, and third planetary gear sets PG1, PG2, and PG3, thereby realizing the forward second speed, and the delivered torque is output through the output gear OG.

[The Forward Third Speed]

In the forward third speed D3, the first, second, and fourth clutches C1, C2, and C4 are simultaneously operated.

As a result, the first shaft TM1 is connected with the fifth shaft TM5 by the operation of the first clutch C1, the third shaft TM3 is connected with the fifth shaft TM5 by the operation of the second clutch C2, third shaft TM3 is externally gear-meshed with the output shaft OS by the operation of the fourth clutch C4, and the torque of the input shaft IS is input to the fourth shaft TM4.

Then the first and second planetary gear sets PG1 and PG2 integrally rotate, and the input torque is delivered to the output shaft OS through first transfer gear TF1, thereby realizing the forward third speed, and the delivered torque is output through the OG.

[The Forward Fourth Speed]

In the forward fourth speed D4, the first, third, and fourth clutches C1, C3, and C4 are simultaneously operated.

As a result, the first shaft TM1 is connected with the fifth shaft TM5 by the operation of the first clutch C1, the input shaft IS is connected with the sixth shaft TM6 by the operation of the third clutch C3, third shaft TM3 is externally gear-meshed with the output shaft OS by the operation of the fourth clutch C4, and the torque of the input shaft IS is input to the fourth shaft TM4 and the sixth shaft TM6.

Then, shifted torques are delivered to the output shaft OS through both the first transfer gear TF1 and the second transfer gear TF2 by cooperative operation of respective shafts of the first, second, and third planetary gear sets PG1, PG2, and PG3, thereby realizing the forward fourth speed, and the delivered torque is output through the output gear OG.

[The Forward Fifth Speed]

In the forward fifth speed D5, the first, second, and third clutches C1, C2, and C3 are simultaneously operated.

As a result, the first shaft TM1 is connected with the fifth shaft TM5 by the operation of the first clutch C1, the third shaft TM3 is connected with the fifth shaft TM5 by the operation of the second clutch C2, the input shaft IS is connected with the sixth shaft TM6 by the operation of the third clutch C3, and the torque of the input shaft IS is input to the fourth shaft TM4 and the sixth shaft TM6.

Then, the torque is delivered to the output shaft OS through the second transfer gear TF2 by cooperative operation of respective shafts of the first, second, and third planetary gear sets PG1, PG2, and PG3, thereby realizing the forward fifth speed, and the delivered torque is output through the output gear OG.

[The Forward Sixth Speed]

In the forward sixth speed D6, the second and third clutches C2 and C3 and the second brake B2 are simultaneously operated.

As a result, the third shaft TM3 is connected with the fifth shaft TM5 by the operation of the second clutch C2, the input shaft IS is connected with the sixth shaft TM6 by the operation of the third clutch C3, and the torque of the input shaft IS is input to the fourth shaft TM4 and the sixth shaft TM6.

Then, the first shaft TM1 acts as a fixed element by the operation of the second brake B2, the shifted torque is delivered to the output shaft OS through the second transfer gear TF2 by cooperative operation of respective shafts of the first, second, and third planetary gear sets PG1, PG2, and PG3, thereby realizing the forward sixth speed, and the delivered torque is output through the output gear OG.

[The Forward Seventh Speed]

In the forward seventh speed D7, the second and third clutches C2 and C3 and the first brake B1 are simultaneously operated.

As a result, the third shaft TM3 is connected with the fifth shaft TM5 by the operation of the second clutch C2, the input shaft IS is connected with the sixth shaft TM6 by the operation of the third clutch C3, and the torque of the input shaft IS is input to the fourth shaft TM4 and the sixth shaft TM6.

As a result, the second shaft TM2 acts as a fixed element by the operation of the first brake B1, the shifted torque is delivered to the output shaft OS through the second transfer gear TF2 by cooperative operation of respective shafts of the first, second, and third planetary gear sets PG1, PG2, and PG3, thereby realizing the forward seventh speed, and the delivered torque is output through the output gear OG.

[The Forward Eighth Speed]

In the forward eighth speed D8, the third clutch C3 and the first and second brakes B1 and B2 are simultaneously operated.

As a result, the input shaft IS is connected with the sixth shaft TM6 by the operation of the third clutch C3, and the torque of the input shaft IS is input to the fourth shaft TM4 and the sixth shaft TM6.

Then, the first shaft TM1 and the second shaft TM2 act as fixed elements by the operation of the second and first brakes B2 and B1, the shifted torque is delivered to the output shaft OS through the second transfer gear TF2 by cooperative operation of respective shafts of the first, second, and third planetary gear sets PG1, PG2, and PG3, thereby realizing the forward eighth speed, and the delivered torque is output through the output gear OG.

[The Forward Ninth Speed]

In the forward ninth speed D9, the first and third clutches C1 and C3 and the first brake B1 are simultaneously operated.

As a result, the first shaft TM1 is connected with the fifth shaft TM5 by the operation of the first clutch C1, the input shaft IS is connected with the sixth shaft TM6 by the operation of the third clutch C3, and the torque of the input shaft IS is input to the fourth shaft TM4 and the sixth shaft TM6.

As a result, the second shaft TM2 acts as a fixed element by the operation of the first brake B1, the shifted torque is delivered to the output shaft OS through the second transfer gear TF2 by cooperative operation of respective shafts of the first, second, and third planetary gear sets PG1, PG2, and PG3, thereby realizing the forward ninth speed, and the delivered torque is output through the output gear OG.

[The Forward Tenth Speed]

In the forward tenth speed D10, the first and third clutches C1 and C3 and the second brake B2 are simultaneously operated.

As a result, the first shaft TM1 is connected with the fifth shaft TM5 by the operation of the first clutch C1, the input shaft IS is connected with the sixth shaft TM6 by the operation of the third clutch C3, and the torque of the input shaft IS is input to the fourth shaft TM4 and the sixth shaft TM6.

Then, the first shaft TM1 acts as a fixed element by the operation of the second brake B2, the shifted torque is delivered to the output shaft OS through the second transfer gear TF2 by cooperative operation of respective shafts of the first, second, and third planetary gear sets PG1, PG2, and PG3, thereby realizing the forward tenth speed, and the delivered torque is output through the output gear OG.

[The Reverse First Speed]

In the reverse first speed REV1, the first, fourth clutch C1 and C4 and the first brake B1 are simultaneously operated.

As a result, the first shaft TM1 is connected with the fifth shaft TM5 by the operation of the first clutch C1, third shaft TM3 is externally gear-meshed with the output shaft OS by the operation of the fourth clutch C4, the torque of the input shaft IS is input to the fourth shaft TM4.

As a result, the second shaft TM2 acts as a fixed element by the operation of the first brake B1, a shifted torque is delivered to the output shaft OS through the first transfer gear TF1 by cooperative operation of respective shafts of the first, second, and third planetary gear sets PG1, PG2, and PG3, thereby realizing the reverse first speed, and the delivered torque is output through the output gear OG.

[The Reverse Second Speed]

In the reverse second speed shift-stage REV2, the first, fourth clutch C1 and C4 and the second brake B2 are simultaneously operated.

As a result, the first shaft TM1 is connected with the fifth shaft TM5 by the operation of the first clutch C1, third shaft TM3 is externally gear-meshed with the output shaft OS by the operation of the fourth clutch C4, and the torque of the input shaft IS is input to the fourth shaft TM4.

Then, the first shaft TM1 acts as a fixed element by the operation of the second brake B2, a shifted torque is delivered to the output shaft OS through the first transfer gear TF1 by cooperative operation of respective shafts of the first, second, and third planetary gear sets PG1, PG2, and PG3, thereby realizing the reverse second speed, and the delivered torque is output through the output gear OG.

Figure 3:
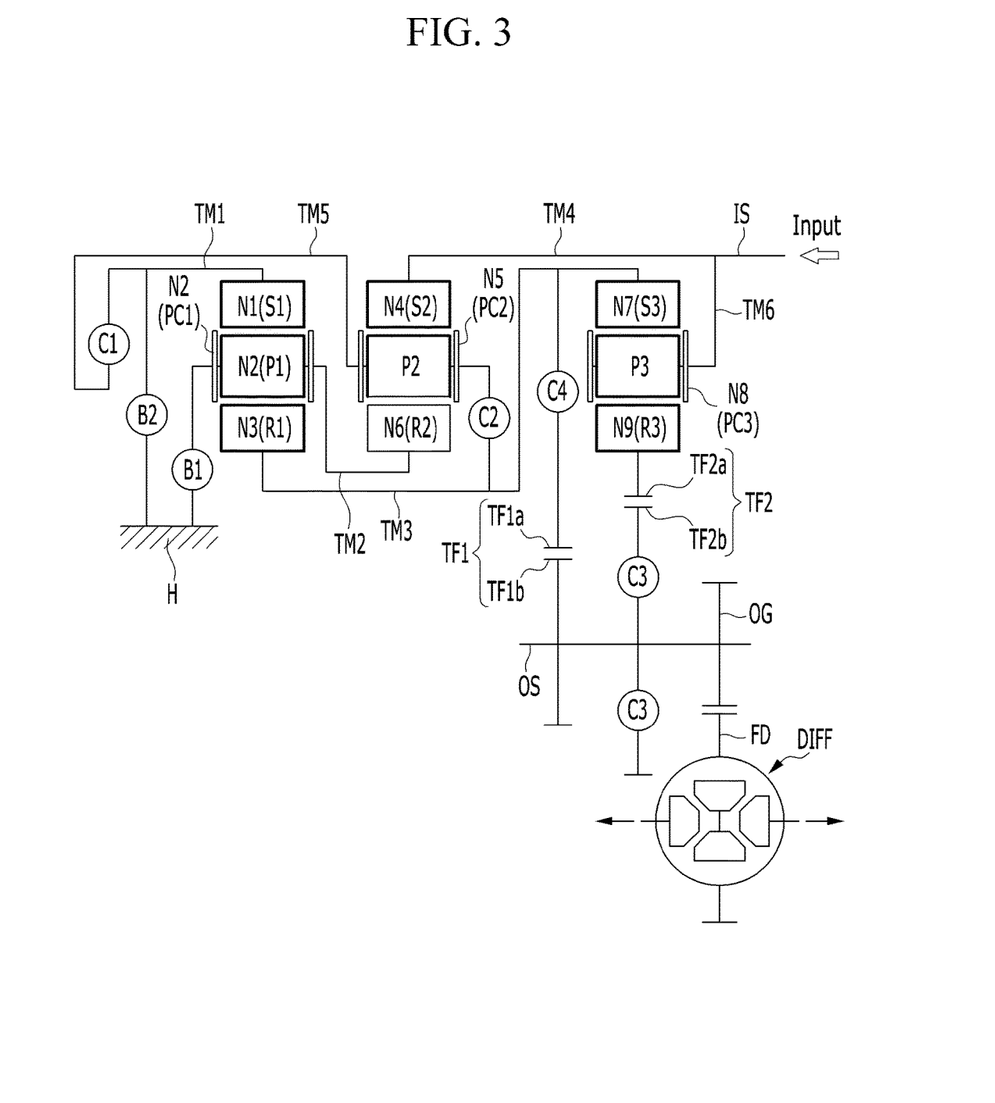
FIG. 3 is a schematic diagram of a planetary gear train according to a second exemplary form of the present disclosure.

FIG. 3 is a schematic diagram of a planetary gear train according to a second exemplary form of the present disclosure.

Referring to FIG. 3, according to a second exemplary form, the third clutch C3 is arranged to the second transfer driven gear TF2b of the second transfer gear TF2 in comparison with the first exemplary form of the present disclosure shown in FIG. 1, where the third clutch C3 for controlling a torque delivery from the input shaft IS to the output shaft OS through the third planetary gear set PG3 is arranged between the input shaft IS and the sixth shaft TM6.

As a result, the second exemplary form only differs in the location of the third clutch C3 in comparison with the first exemplary form and maintains the same operation and functionality, which is therefore not described in further detail.

Figure 4:
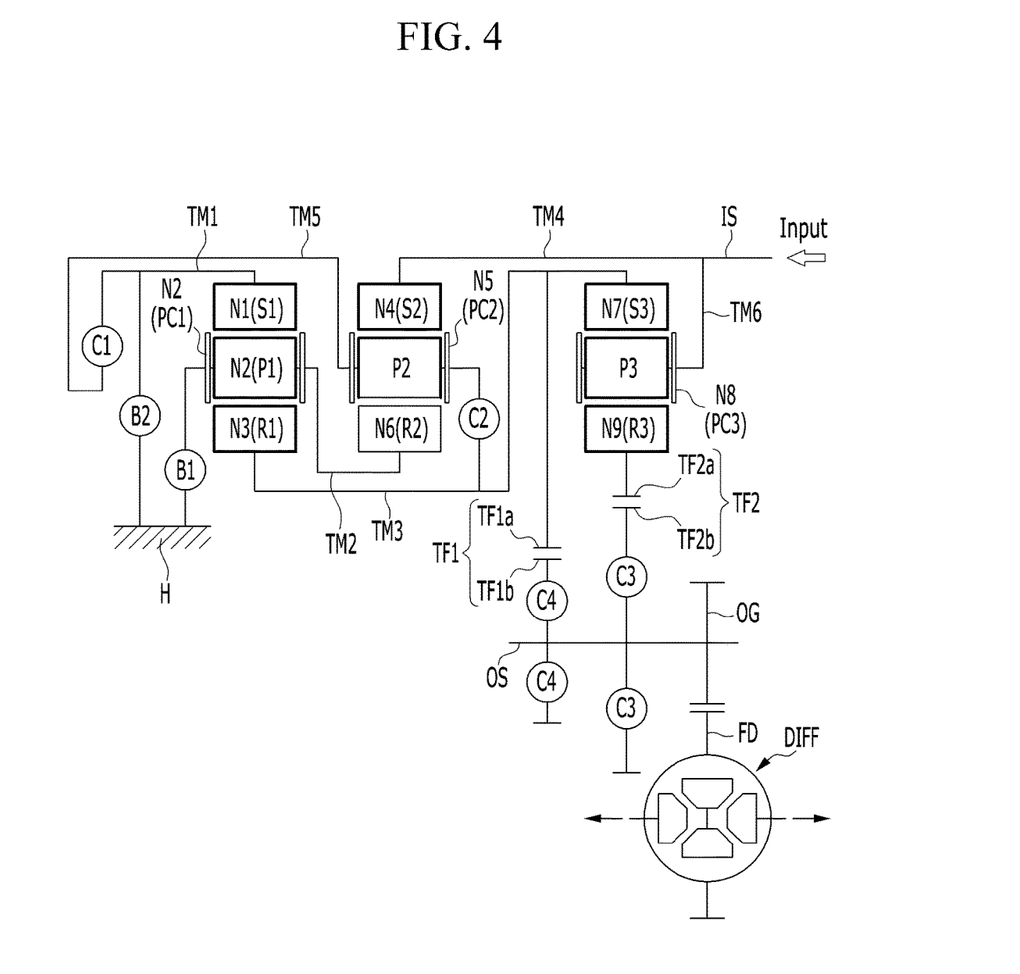
FIG. 4 is a schematic diagram of a planetary gear train according to a third exemplary form of the present disclosure.

FIG. 4 is a schematic diagram of a planetary gear train according to a third exemplary form of the present disclosure.

Referring to FIG. 4, according to a third exemplary form, the fourth clutch C4 for controlling torque delivery between the third shaft TM3 and the output shaft OS is arranged between the output shaft OS and the first transfer driven gear TF1 b of the first transfer gear TF1, in comparison with the second exemplary form shown in FIG. 3, where the fourth clutch is arranged between the third shaft TM3 and the first transfer drive gear TF1a of the first transfer gear TF1.

As a result, the third exemplary form only differs in the location of the fourth clutch C4 in comparison with the second exemplary form and maintains the same operation and functionality, which is therefore not described in further detail.

Figure 5:
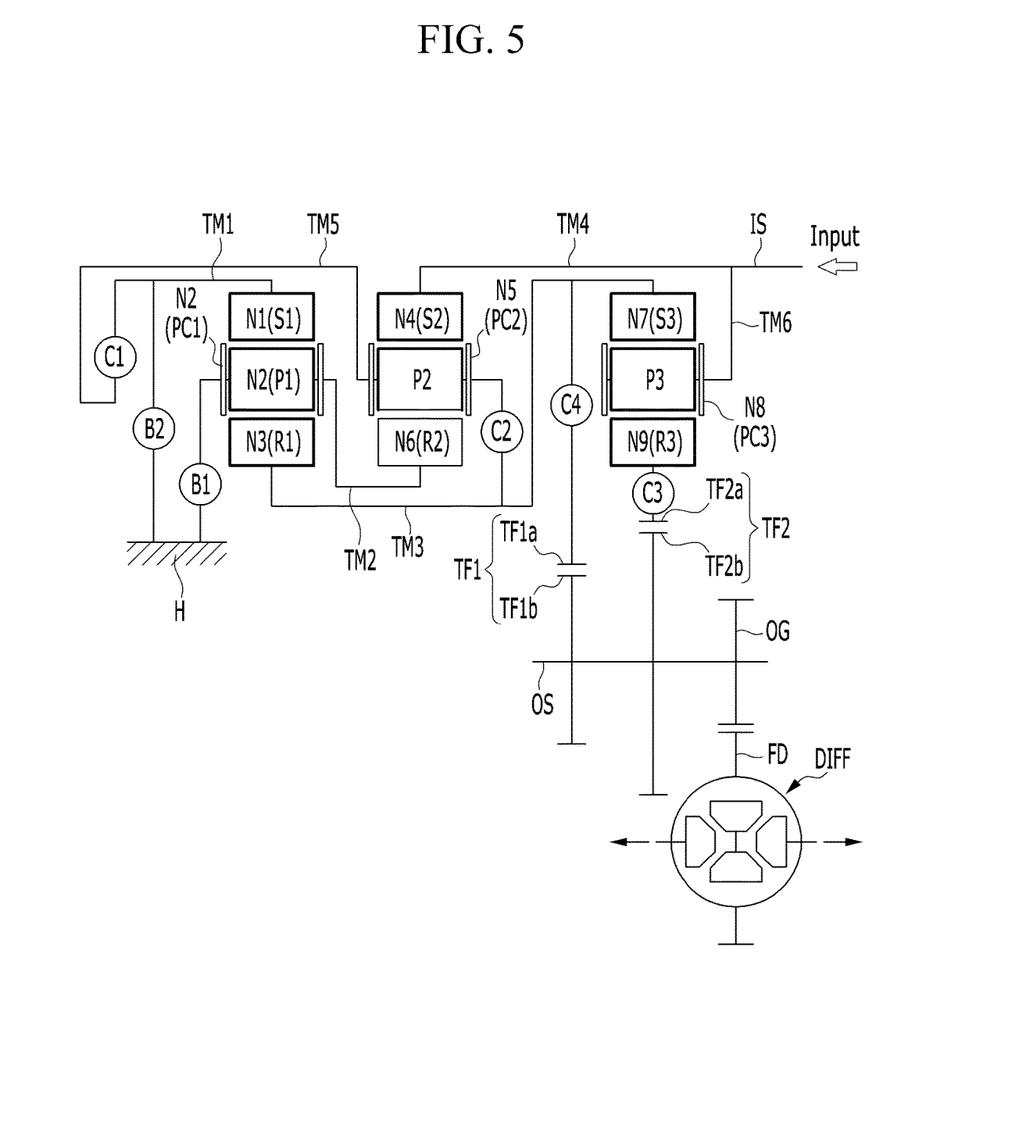
FIG. 5 is a schematic diagram of a planetary gear train according to a fourth exemplary form of the present disclosure.

FIG. 5 is a schematic diagram of a planetary gear train according to a fourth exemplary form of the present disclosure.

Referring to FIG. 5, according to a fourth exemplary form, the third clutch C3 is arranged between the ninth rotation element N9 and the second transfer drive gear TF2a of the second transfer gear TF2 in comparison with the first exemplary form of the present disclosure shown in FIG. 1, where the third clutch C3 for controlling a torque delivery from the input shaft IS to the output shaft OS through the third planetary gear set PG3 is arranged between the input shaft IS and the sixth shaft TM6.

As a result, the second exemplary form only differs in the location of the third clutch C3 in comparison with the first exemplary form and maintains the same operation and functionality, which is therefore not described in further detail.

As described above, a planetary gear train according to an exemplary form of the present disclosure realizes shift-stages of the forward ten speeds and two reverse speeds by a combination of three planetary gear sets PG1, PG2, and PG3 disposed on the input shaft IS, output shaft OS receiving torque from the planetary gear sets through two transfer gear TF1 and TF2, and control elements of four clutches C1, C2, C3, and C4 and two brakes B1 and B2, thereby providing improvement of power delivery performance and fuel consumption and improving installability by shortening the length of an automatic transmission.

In addition, according to a planetary gear train according to an exemplary form of the present disclosure, two transfer gears of external gears are employed in addition to the planetary gear sets, and thus, gear teeth may be widely varied so as to easily achieve optimum gear ratio and to easily comply with desired performance for respective vehicles.

In addition, a planetary gear train according to an exemplary form of the present disclosure realizes at least ten forward speeds and at least two reverse speed, thereby improving an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1, PG2, PG3: first, second, and third planetary gear sets
S1, S2, S3: first, second, and third sun gears
PC1, PC2, PC3: first, second, and third planet carriers
R1, R2, R3: first, second, and third ring gears
IS: input shaft
OS: output shaft
B1, B2: first and second brakes
C1, C2, C3, C4: first, second, third, and fourth clutches
TF1, TF2: first and second transfer gears
TM1, TM2, TM3, TM4, TM5, TM6: first, second, third, fourth, fifth, and sixth shafts

What is claimed is:

1. A planetary gear train of an automatic transmission for a vehicle, comprising:
    a first planetary gear set having first, second, and third rotational elements;
    a second planetary gear set having fourth, fifth, and sixth rotational elements;
    a third planetary gear set having seventh, eighth, and ninth rotational elements;
    an input shaft mounted with the first, second, and third planetary gear sets at an external circumference of the input shaft; and
    an output shaft disposed in parallel with the input shaft and provided with an output gear at an external circumference of the output shaft;
    a first shaft fixedly connected with the first rotational element and selectively acting as a fixed element;

a second shaft fixedly connected with the second rotational element and the sixth rotational element and selectively acting as a fixed element;
a third shaft fixedly connected with the third rotational element and the seventh rotational element and configured to selectively mesh with the output shaft;
a fourth shaft fixedly connected with the fourth rotational element and the input shaft;
a fifth shaft fixedly connected with the fifth rotational element and selectively connected with the first shaft and the third shaft respectively;
a sixth shaft fixedly connected with the eighth rotational element and selectively connected with the input shaft;
a first transfer gear configured to selectively deliver a torque between the third shaft and the output shaft; and
a second transfer gear configured to selectively deliver a torque between the output shaft and the ninth rotational element of the third planetary gear set.

2. The planetary gear train of claim 1, wherein:
the first planetary gear set includes a first sun gear as the first rotational element, a first planet carrier as the second rotational element, and a first ring gear as the third rotational element;
the second planetary gear set includes a second sun gear as the fourth rotational element, a second planet carrier as the fifth rotational element, and a second ring gear as the sixth rotational element; and
the third planetary gear set includes a third sun gear as the seventh rotational element, a third planet carrier as the eighth rotational element, and a third ring gear as the ninth rotational element.

3. The planetary gear train of claim 1, wherein the first, second, and third planetary gear sets are arranged on the input shaft in the order of the first, second, and third planetary gear sets.

4. The planetary gear train of claim 1, further comprising:
a first clutch arranged between the first shaft and the fifth shaft;
a second clutch arranged between the third shaft and the fifth shaft;
a third clutch arranged between the input shaft and the sixth shaft;
a fourth clutch arranged between the third shaft and the output shaft;
a first brake arranged between the second shaft and a transmission housing; and
a second brake arranged between the first shaft and the transmission housing.

5. The planetary gear train of claim 4, wherein the fourth clutch is directly connected to the first transfer gear.

6. A planetary gear train of an automatic transmission for a vehicle, comprising:
a first planetary gear set having first, second, and third rotational elements;
a second planetary gear set having fourth, fifth, and sixth rotational elements;
a third planetary gear set having seventh, eighth, and ninth rotational elements;
an input shaft mounted with the first, second, and third planetary gear sets at an external circumference of the input shaft; and
an output shaft disposed in parallel with the input shaft and provided with an output gear at an external circumference of the output shaft;
a first shaft fixedly connected with the first rotational element and selectively acting as a fixed element;
a second shaft fixedly connected with the second rotational element and the sixth rotational element and selectively acting as a fixed element;
a third shaft fixedly connected with the third rotational element and the seventh rotational element and configured to selectively mesh with the output shaft;
a fourth shaft fixedly connected with the fourth rotational element and the input shaft;
a fifth shaft fixedly connected with the fifth rotational element and selectively connected with the first shaft and the third shaft respectively;
a sixth shaft fixedly connected with the eighth rotational element and the input shaft;
a first transfer gear configured to selectively deliver a torque between the third shaft and the output shaft; and
a second transfer gear configured to selectively deliver a torque between the output shaft and the ninth rotational element of the third planetary gear set.

7. The planetary gear train of claim 6, wherein:
the first planetary gear set includes a first sun gear as the first rotational element, a first planet carrier as the second rotational element, and a first ring gear as the third rotational element;
the second planetary gear set includes a second sun gear as the fourth rotational element, a second planet carrier as the fifth rotational element, and a second ring gear as the sixth rotational element; and
the third planetary gear set includes a third sun gear as the seventh rotational element, a third planet carrier as the eighth rotational element, and a third ring gear as the ninth rotational element.

8. The planetary gear train of claim 6, wherein first, second, and third planetary gear sets are arranged on the input shaft in the order of the first, second, and third planetary gear sets.

9. The planetary gear train of claim 6, wherein:
a first clutch arranged between the first shaft and the fifth shaft;
a second clutch arranged between the third shaft and the fifth shaft;
a third clutch arranged between the output shaft and the ninth rotational element of the third planetary gear set;
a fourth clutch arranged between the third shaft and the output shaft;
a first brake arranged between the second shaft and a transmission housing; and
a second brake arranged between the first shaft and the transmission housing.

10. The planetary gear train of claim 9, wherein:
the third clutch is directly connected to the second transfer gear; and
the fourth clutch is directly connected to the first transfer gear.

11. The planetary gear train of claim 6, wherein the third shaft is externally gear-meshed with the output shaft.

* * * * *